US010784921B2

(12) United States Patent
Hu et al.

(10) Patent No.: US 10,784,921 B2
(45) Date of Patent: Sep. 22, 2020

(54) COMPRESSION RECEIVER ARCHITECTURE FOR WIRELESS COMMUNICATIONS SYSTEMS

(71) Applicants: Lan Hu, Ottawa (CA); Sai Mohan Kilambi, Nepean (CA)

(72) Inventors: Lan Hu, Ottawa (CA); Sai Mohan Kilambi, Nepean (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/184,369

(22) Filed: Nov. 8, 2018

(65) Prior Publication Data
US 2020/0153477 A1   May 14, 2020

(51) Int. Cl.
*H04B 1/66*         (2006.01)
*H04B 1/7163*       (2011.01)

(52) U.S. Cl.
CPC .......... *H04B 1/66* (2013.01); *H04B 1/71637* (2013.01)

(58) Field of Classification Search
CPC ........ H04B 1/66; H04B 1/7085; H04B 1/709; H04B 1/7093; H04B 1/71637; H04N 5/917; H04N 5/926; H04N 5/9261
USPC ....... 375/134, 136, 137, 142, 143, 147, 150, 375/152, 240–242, 343; 704/500, 501, 704/503, 504
See application file for complete search history.

(56) References Cited

U.S. PATENT DOCUMENTS 9,391,631 B1 * 7/2016 Thompson ............ H04B 7/086
2006/0002260 A1   1/2006 Mino et al.
(Continued)

FOREIGN PATENT DOCUMENTS

CN    105610477 A    5/2016
WO      9946914 A2   9/1999
(Continued)

OTHER PUBLICATIONS

Tzeng et al. 'A CMOS Code-Modulated Path-Sharing Multi-Antenna Receiver Front-End', IEEE Journal of solid-state circuits, pp. 1321-1335, vol. 44, No. 5, May 2009.
(Continued)

*Primary Examiner* — Young T Tse
(74) *Attorney, Agent, or Firm* — BCF LLP (57) ABSTRACT

The disclosed systems, structures, and methods are directed to a receiver architecture. The configurations presented herein employ a structure operative to receive a plurality of wireless analog signals, a signal encoding module configured to encode the plurality of received analog signals into a single encoded analog signal based on a coding scheme, a code compression module operative to compress the code scheme. In addition, a spectrum compression module is configured to under-sample the single encoded analog signal to generate a spectrum-compressed digital signal, a spectrum recovery module operative to recover desired information content of the received analog signals from the spectrum-compressed digital signal and to generate a digital recovery signal, and a signal detection module configured to decode the digital recovery signal based on the coding scheme and to output analog signals replicating the received wireless signals containing the desired information content.

20 Claims, 7 Drawing Sheets

(56) References Cited

U.S. PATENT DOCUMENTS

| | | | | |
|---|---|---|---|---|
| 2007/0088515 A1* | 4/2007 | Kim | ............... | H04L 7/007 |
| | | | | 702/79 |
| 2011/0135021 A1 | 6/2011 | Hatakawa et al. | | |
| 2015/0194989 A1* | 7/2015 | Mkadem | ............... | H03F 1/3247 |
| | | | | 375/297 |
| 2019/0326948 A1* | 10/2019 | Hu | ............... | H04B 1/70735 |

FOREIGN PATENT DOCUMENTS

| | | | |
|---|---|---|---|
| WO | 2006022156 A1 | 3/2006 | |
| WO | 2017007546 A1 | 1/2017 | |

OTHER PUBLICATIONS

Filing Receipt of U.S. Appl. No. 15/956,499, filed Apr. 18, 2018.
3rd Generation Partnership Project; Technical Specification Group Services and System Aspects; Performance characterization of the Adaptive Multi-Rate Wideband (AMR-WB) speech codec (Release 15), 3GPP TR 26.976 V15.0.0, Jun. 30, 2018, total 105 pages.

\* cited by examiner

COMPRESSION RECEIVER ARCHITECTURE FOR WIRELESS COMMUNICATIONS SYSTEMS

CROSS-REFERENCE TO RELATED APPLICATIONS

This is the first application filed for the instantly disclosed technology.

FIELD OF THE INVENTION

The present invention generally relates to the field of wireless communications and, in particular, to a wireless communication receiver architecture employing compression techniques to provide reduced encoded signal rates and condensed signal spectrums for efficient processing of wireless signals.

BACKGROUND

Typically, wireless communication receiver systems receive data signals that have been modulated, encoded, and spread across a wide frequency spectrum. That is, multiple data signals are combined using a code having a higher frequency rate than the data signals. This combination yields an output signal that is spread across a wide bandwidth. The use of high code rates to spread the data signals enables the sharing of receiver hardware resources by combining multiple input signals to a single signal while also providing a greater resistance to interference and increased reliability (e.g., lower error vector magnitude (EVM) values).

However, it will be appreciated that the decoding operations of these high code rate signals presents certain challenges to wireless receiver systems. Namely, receiver systems need to employ hardware, software, and firmware elements that are capable of operating at higher speeds to properly process the high code rate signals.

These challenges may be exacerbated by certain proposed enhancements to existing wireless communication systems as well as next-generation wireless communication designs. Such enhancements and designs include expanding the deployment of antenna receiver systems, such as, for example, multiple-input, multiple-output (MIMO) and massive-MIMO (M-MIMO) receiver architectures. These receiver architectures may be required to accommodate a higher number of disparately formatted signals such as those used in Third Generation (3G) networks, Fourth Generation (4G) networks such as those based on the Long Term Evolution (LTE), and fifth generation (5G) networks thereby potentially straining receiver hardware and software processing resources.

SUMMARY

An object of the present disclosure is to provide a wireless receiver architecture for processing wireless analog signals. The disclosure presented herein employs a structure operative to receive a plurality of wireless analog signals. A signal encoding module is configured to encode the plurality of received analog signals into a single encoded analog signal based on a coding scheme. A spectrum compression module is configured to under-sample the single encoded analog signal to generate a spectrum-compressed digital signal. A spectrum recovery module is configured to receive the spectrum-compressed digital signal and expand the spectrum-compressed digital signal to the first code rate and to generate a digital recovery signal containing the desired information content. A signal detection module configured to decode the digital recovery signal based on the coding scheme and to output analog signals replicating the received wireless signals containing the desired information content.

In accordance with other aspects of the present disclosure, the wireless receiver architecture further includes a code compression module operative to compress the coding scheme by reducing the first code rate to a second code rate in accordance with a code compression rate parameter and to supply the compressed code scheme to the signal encoding module. The code compression module may perform the down-sampling operations on the coding scheme to generate the compressed code scheme at the second code rate.

In accordance with other aspects of the present disclosure, the wireless receiver architecture further includes a configuration control module operative to provide control signal parameters to the code compression module, the spectrum compression module, and the spectrum recovery module. The control signal parameters include on or more of the following: code type, code rate, code compression rate, spectrum compression rate, spectrum expansion ratio, ADC clock rate, and filter coefficient(s).

In accordance with other aspects of the present disclosure, there is provided a method of processing wireless signals. The disclosure presented herein operates to receive a plurality of wireless analog signals containing desired information content and encodes the received analog signals into a single encoded analog signal in accordance with a coding scheme having a first code rate. The single encoded analog signal is digitally compressed to generate a spectrum-compressed digital signal. The spectrum-compressed digital signal is received and expanded back to the first code rate to generate a digital recovery signal containing the desired information content. The digital recovery signal is decoded in accordance with the coding scheme to output a plurality of analog signals replicating the received wireless signals containing the desired information content.

In accordance with other aspects of the present disclosure, the method of processing wireless signals further includes compressing the coding scheme by reducing the first code rate to a second code rate in accordance with a code compression rate parameter. The compressed code scheme may be achieved by down-sampling the coding scheme.

In accordance with other aspects of the present disclosure, the method of processing wireless signals further includes providing control signal parameters for controlling the operations of generating the compressed code scheme, generating the spectrum-compressed digital signal, generating the expanded-bandwidth digital signal, and the digital recovery signal. The control signal parameters include on or more of the following: code type, code rate, code compression rate, spectrum compression rate, spectrum expansion ratio, ADC clock rate, and filter coefficient(s).

BRIEF DESCRIPTION OF THE FIGURES

The features and advantages of the present disclosure will become apparent from the following detailed description, taken in combination with the appended drawings, in which.

It is to be understood that throughout the appended drawings and corresponding descriptions, like features are identified by like reference characters. Furthermore, it is also to be understood that the drawings and ensuing descriptions are intended for illustrative purposes only and that such disclosures are not intended to limit the scope of the claims.

DETAILED DESCRIPTION

As used herein, the term "about" or "approximately" refers to a +/−10% variation from the nominal value. It is to be understood that such a variation is always included in a given value provided herein, whether or not it is specifically referred to.

Unless otherwise defined, all technical and scientific terms used herein have the same meaning as commonly understood by one of ordinary skill in the art to which the described embodiments appertain.

Conventional Receiver Architecture

Figure 1A:
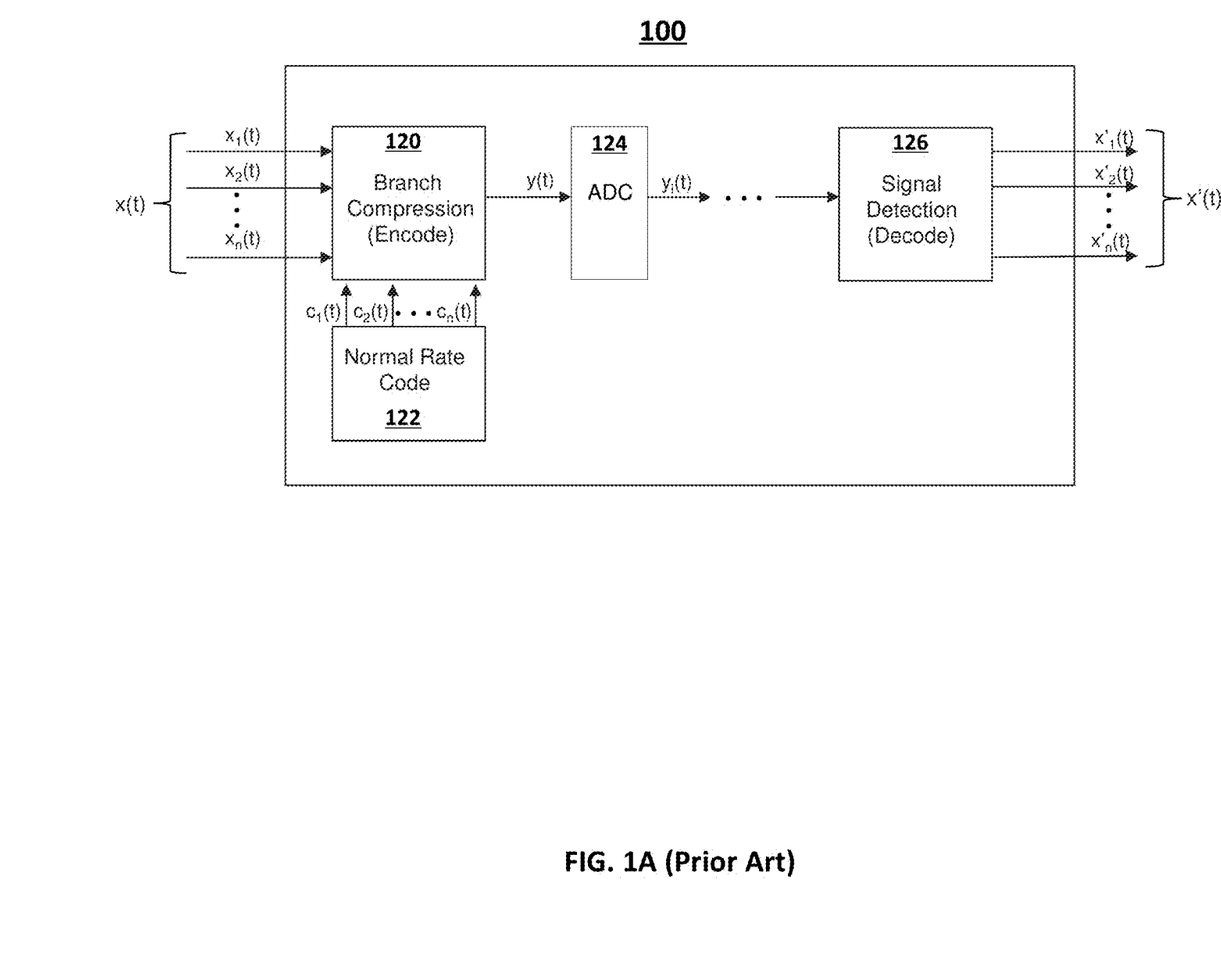
FIG. 1A (Prior Art) depicts a high-level functional block diagram of a conventional receiver architecture.

FIG. 1A (Prior Art) illustrates a functional block diagram of a conventional receiver architecture 100 directed to processing received analog signals. The conventional receiver architecture 100 includes a branch compression module 120, a normal rate code generator 122, an analog-to-digital converter (ADC) 124, and a signal detection module 126. Other elements may be present but not illustrated.

As illustrated by FIG. 1A, conventional receiver architecture 100 receives analog ("branch") input signals $x(t)$: $x_1(t), x_2(t) \ldots x_n(t)$, which may be received by one or more antenna structures (not shown), such as, for example, MIMO/M-MIMO antennas. Moreover, each of the received signals may possess different modulation/encoding characteristics.

As shown, the analog (branch) input signals $x(t)$: $x_1(t), x_2(t) \ldots x_n(t)$ are forwarded to branch compression module 120. The branch compression module 120 is configured to encode and convert the n analog (branch) input signals $x(t)$ into a single, composite, encoded analog signal $y(t)$, in concert with a supplied coding scheme. That is, normal rate code generator 122 supplies branch compression module 120 with a normal rate code scheme $c_i(t)$: $c_1(t), c_2(t) \ldots c_n(t)$ in which each of the n analog input signals $x_1(t), x_2(t) \ldots x_n(t)$ is encoded with the identical code.

Figure 1B:
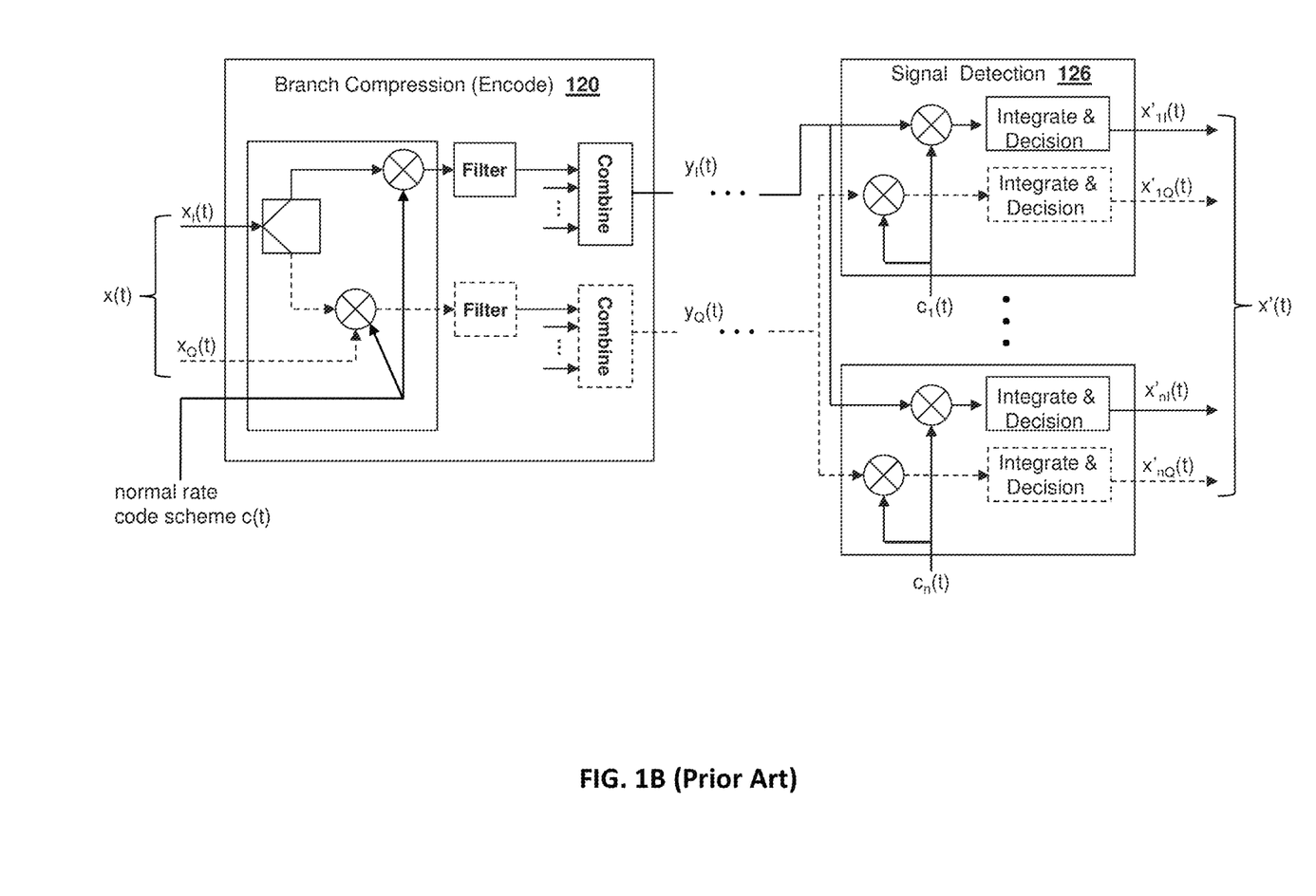
FIG. 1B (Prior Art) depicts a high-level functional block diagram of a conventional branch signal compression module and signal detection module.

In particular, as detailed in FIG. 1B (Prior Art), the encoding operation of branch compression module 120 is accomplished by mixing the analog input (branch) signals $x(t)$: $x_1(t), x_2(t) \ldots x_n(t)$ (or their in-phase and quadrature-phase components $x_I(t), x_Q(t)$, respectively), with the normal rate code scheme $c_i(t)$: $c_1(t), c_2(t) \ldots c_n(t)$. The outputs of the mixing operation may be subsequently filtered and combined to yield a single analog signal $y(t)$ (or a single analog in-phase component $y_I(t)$ and a single analog quadrature-phase component $y_Q(t)$).

It will be appreciated that the supplied code scheme $c_i(t)$: $c_1(t), c_2(t) \ldots c_n(t)$ may be based on any orthogonal or pseudo-random noise (PN) codes such as, for example, Walsh, Hadamard, Gold, Barker codes, etc. These codes exhibit desirable coding characteristics and may be implemented at a substantially higher frequency rate than the analog (branch) input signals $x(t)$: $x_1(t), x_2(t) \ldots x_n(t)$. In so doing, branch compression module 120 outputs a single, composite, high-rate analog signal $y(t)$ that is effectively spread across a wide frequency bandwidth.

The encoded analog signal $y(t)$ may be provided to an analog-to-digital converter ADC 124, which operates to convert analog composite signal $y(t)$ into a digital composite signal $y_i(t)$.

As shown in FIG. 1A (Prior Art), digital signal $y_i(t)$ is subsequently transmitted downstream for further processing, such as, for example, decoding operations performed by signal detection module 126. Signal detection module 126 processes digital composite signal $y_i(t)$ to decode and reconstitute the desired information content contained by the original analog (branch) input signals $x_1(t), x_2(t) \ldots x_n(t)$.

That is, as detailed by FIG. 1B (Prior Art), signal detection module 126 receives and processes digital composite signal $y_i(t)$ (or its in-phase and quadrature-phase components $y_{iI}(t), y_{iQ}(t)$, respectively) by mixing the digital signal $y_i(t)$ with the normal rate code scheme $c_i(t)$. The resulting mixed samples are then integrated to generate signals $x'(t)$: $x'_1(t), x'_2(t) \ldots x'_n(t)$ to provide replicas of the original analog input (branch) signals $x(t)$: $x_1(t), x_2(t) \ldots x_n(t)$ that manifest the desired information content provided by the original analog branch signals.

As noted above, conventional receiver architecture 100 requires hardware and software processes, such as, for example, branch compression module 120, ADC 124, and signal detection module 126, to operate at high processing speeds to accommodate the processing of the encoded, high-rate, wideband signals.

Compression Receiver Architecture

Figure 2A:
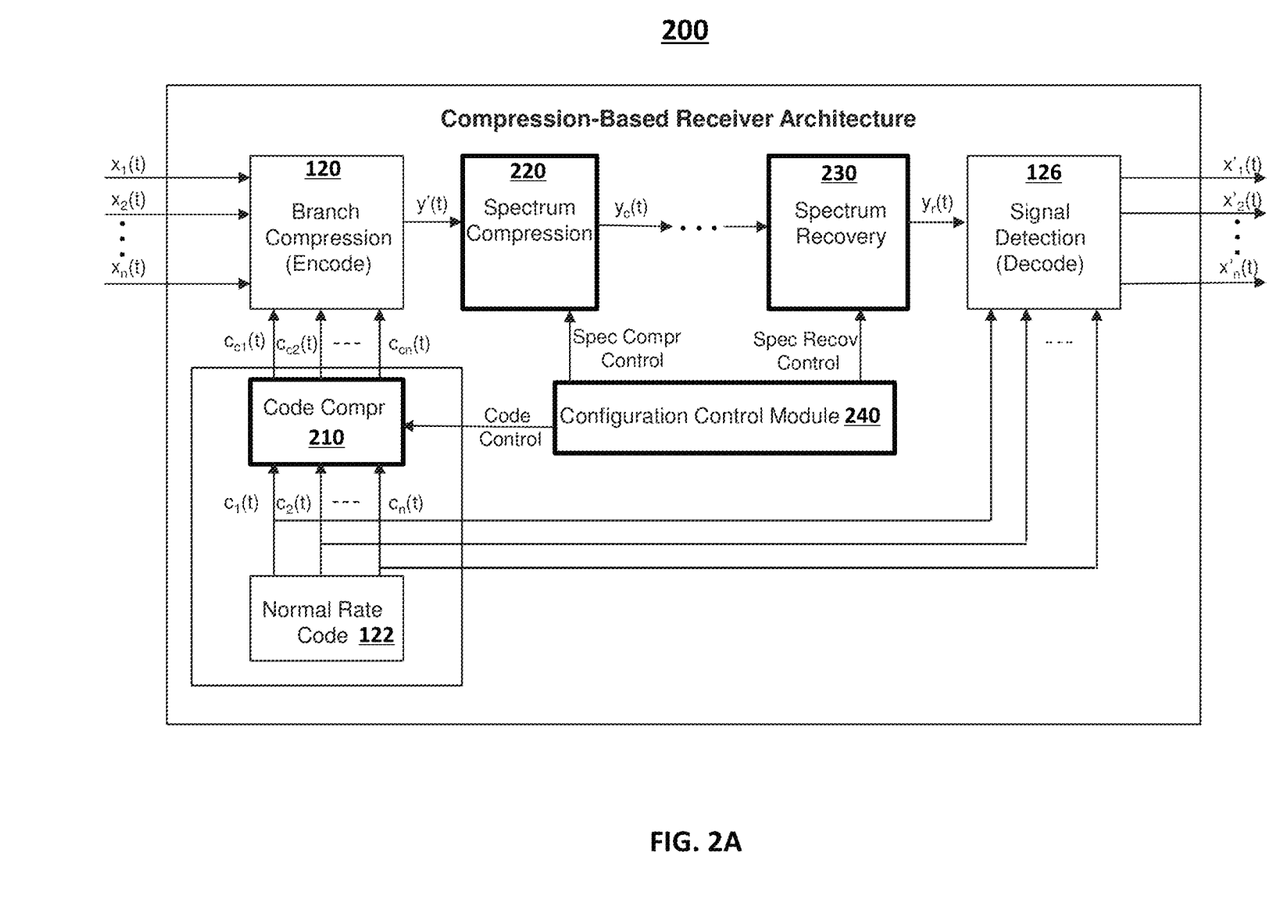
FIG. 2A depicts a high-level functional block diagram of compression receiver architecture, in accordance with various embodiments of the present disclosure.

FIG. 2A depicts a functional block diagram of compression-based receiver architecture 200, in accordance with various embodiments of the present disclosure. As shown, compression receiver 200 employs previously-discussed conventional receiver elements, such as, for example, branch compression module 120, normal rate code generator module 122, and signal detection module 126. More notably, compression receiver 200 further incorporates a configuration control module 240, a code compression module 210, a spectrum compression module 220, and a spectrum recovery module 230.

As will be understood in view of the ensuing descriptions and, in accordance with various embodiments of the present disclosure, the implementation of configuration control module 240, code compression module 210, and spectrum compression module 220 operate to effectively reduce the encoded signal rates and condense the operating signal bandwidths while maintaining data recovery integrity. In so doing, compression receiver architecture 200 substantially relaxes the hardware/software processing speeds and power consumption required to otherwise accommodate the processing of the encoded, high-rate, wide-band signals.

Moreover, consistent with various embodiments of the present disclosure, it will be appreciated that some or all of the notable elements of compression receiver architecture 200, such as, for example, code compression module 210, spectrum compression module 220, spectrum recovery module 230, and/or configuration control module 240, may be implemented by software constructs to facilitate integration with existing receiver architectures.

Configuration Control Module

Configuration control module 240 is configured to store and supply operational control parameters to compression receiver architecture 200 modules, based on intended receiver service applications and designs. To this end and, in accordance with various embodiments of the present disclosure, configuration control module 240 may include a memory to store control parameter data and a processing device to execute and communicate the control parameter data to relevant modules.

As will be detailed by the descriptions below, in various embodiments, configuration control module 240 operates to supply code control parameters to module 210, spectrum compression control parameters to module 220, and spectrum recovery control parameters to module 230 to ensure proper module functionality.

Receiver Code Compression Module

As discussed above regarding conventional receiver architecture 100, branch compression module 120 employs a normal rate code scheme $c_1(t)$, $c_2(t)$ ... $c_n(t)$ to output a composite, high-rate encoded analog signal y(t). However, as illustrated in FIG. 2, compression receiver architecture 200 implements code compression module 210 configured to reduce the operating code rate of branch compression module 120.

Figure 2B:
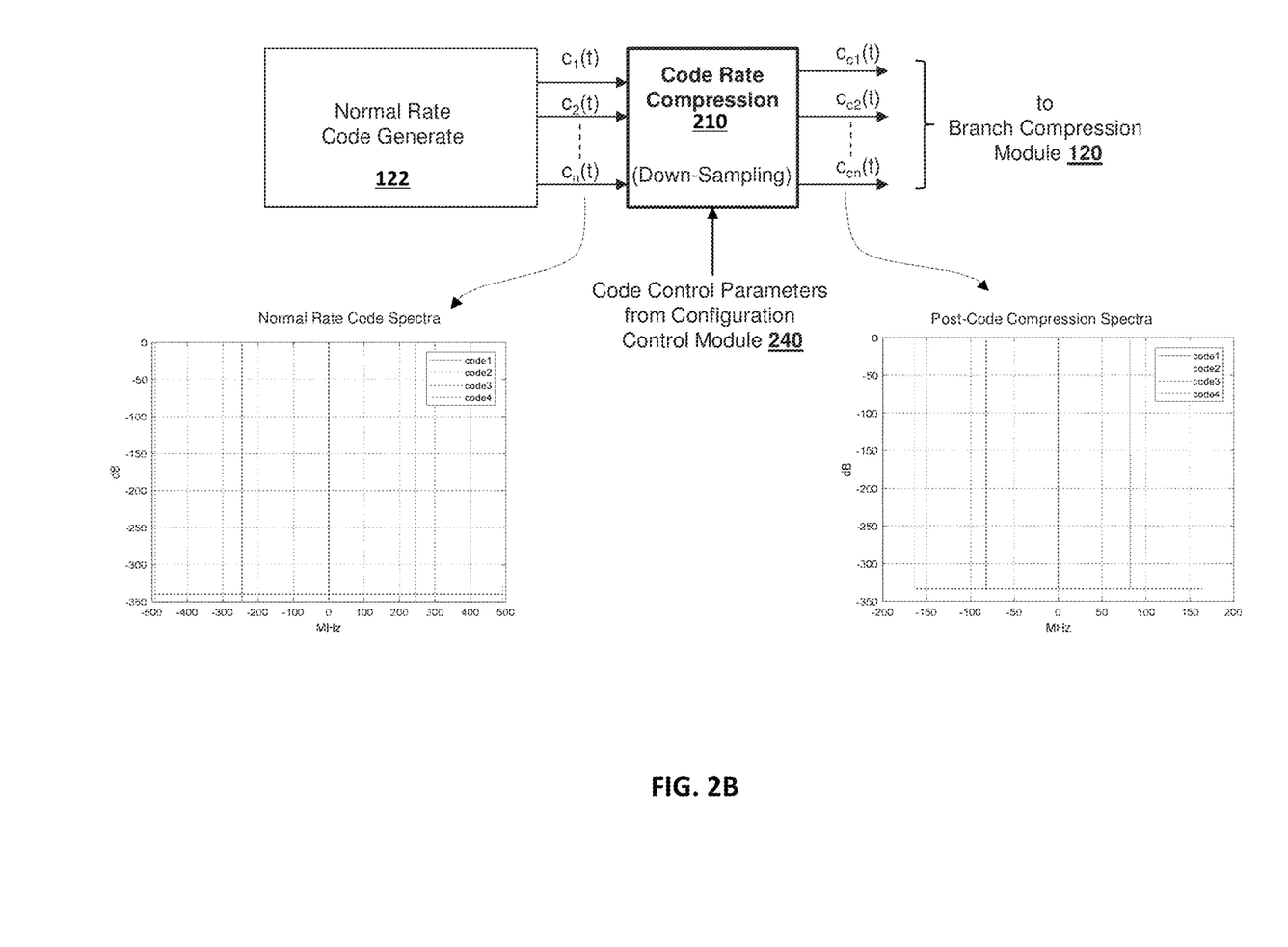
FIG. 2B depicts a high-level functional block diagram of a representative code compression module, in accordance with various embodiments of the present disclosure.

To this end, FIG. 2B depicts a high-level functional block diagram of code compression module 210, in accordance with various embodiments of the present disclosure. As shown, code compression module 210 performs a down-sampling operation on normal rate codes $c_1(t)$, $c_2(t)$ ... $c_n(t)$ to generate compressed codes $c_{c1}(t)$, $c_{c2}(t)$ ... $c_{cn}(t)$ having a reduced code rate, such as, for example, normal code rate/3. The compressed codes $c_{c1}(t)$, $c_{c2}(t)$ ... $c_{cn}(t)$ are then forwarded to branch compression module 120 to output a lower-rate, composite, analog signal y'(t) having a narrower bandwidth.

In accordance with the disclosed embodiments, the down-sampling operation may be implemented by a sample-and-hold application. However, it is to be understood that the down-sampling may be achieved by other suitable techniques directed to reducing signal rates, without departing from the principles presented herein. For example, down-sampling may be achieved by omitting i consecutive samples out of every j samples or other similar construct.

As shown in FIG. 2B, code compression module 210 is supplied with operating code control parameters by configuration control module 240. That is, configuration control module 240 provides code compression module 210 with code control parameter information, such as, for example, code type data, code rate data, code compression rate data, etc. to enable the proper functioning of down-sampling operations.

FIG. 2B further depicts representative spectral properties of normal rate codes $c_1(t)$, $c_2(t)$ ... $c_n(t)$ and compressed codes $c_{c1}(t)$, $c_{c2}(t)$ ... $c_{cn}(t)$. As shown, normal rate codes $c_1(t)$, $c_2(t)$ ... $c_n(t)$ exhibit a frequency span of 1.2 GHZ while compressed codes $c_{c1}(t)$, $c_{c2}(t)$ ... $c_{cn}(t)$, with a compressed code rate of normal code rate/3, exhibit a frequency span of 400 MHz.

It will be appreciated that in some instances, the normal rate code $c_1(t)$, $c_2(t)$ ... $c_n(t)$ and its attributes may be known a priori and the code compression rate may be pre-defined. For such instances, certain embodiments may exploit such information and generate compressed codes $c_{c1}(t)$, $c_{c2}(t)$ ... $c_{cn}(t)$ without employing normal rate code generator module 122.

With this said, by virtue of compressing the code rate, the encoded analog signal y'(t) operates at a lower signal rate, the hardware/software processing speeds are reduced, and power consumption is decreased due to reduced processing speeds.

Receiver Spectrum Compression Module

As indicated by FIG. 2, the lower-rate encoded analog signal y'(t) outputted by branch compression module 120 is supplied to spectrum compression module 220. Spectrum compression module 220 operates to digitize and compress the bandwidth of low-rate encoded analog signal y'(t) to output a spectrum-compressed digital signal $y_c(t)$.

Consistent with the disclosed embodiments, the spectrum compression operation may be achieved by a digital under-sampling function. For example, as shown in FIG. 2C, spectrum compression may be accomplished by controlling a clock-driving signal to ADC(s) to under-sample analog signal y'(t) (or its in-phase and quadrature-phase components, $y'_I(t)$ and $y'_Q(t)$, respectively) to yield a spectrum-compressed digital signal $y_c(t)$.

It is to be understood, however, that the under-sampling may be achieved by other suitable techniques without departing from the principles presented herein. For example, the spectrum compression operation may be accomplished by omitting or dropping one out of every j adjacent digital samples of analog signal y'(t).

The spectrum compression control parameters may be provided by configuration control module 240. Such control parameters may be include, for example, spectrum compression rate, ADC clock rate, and sample drop rate.

Figure 2C:
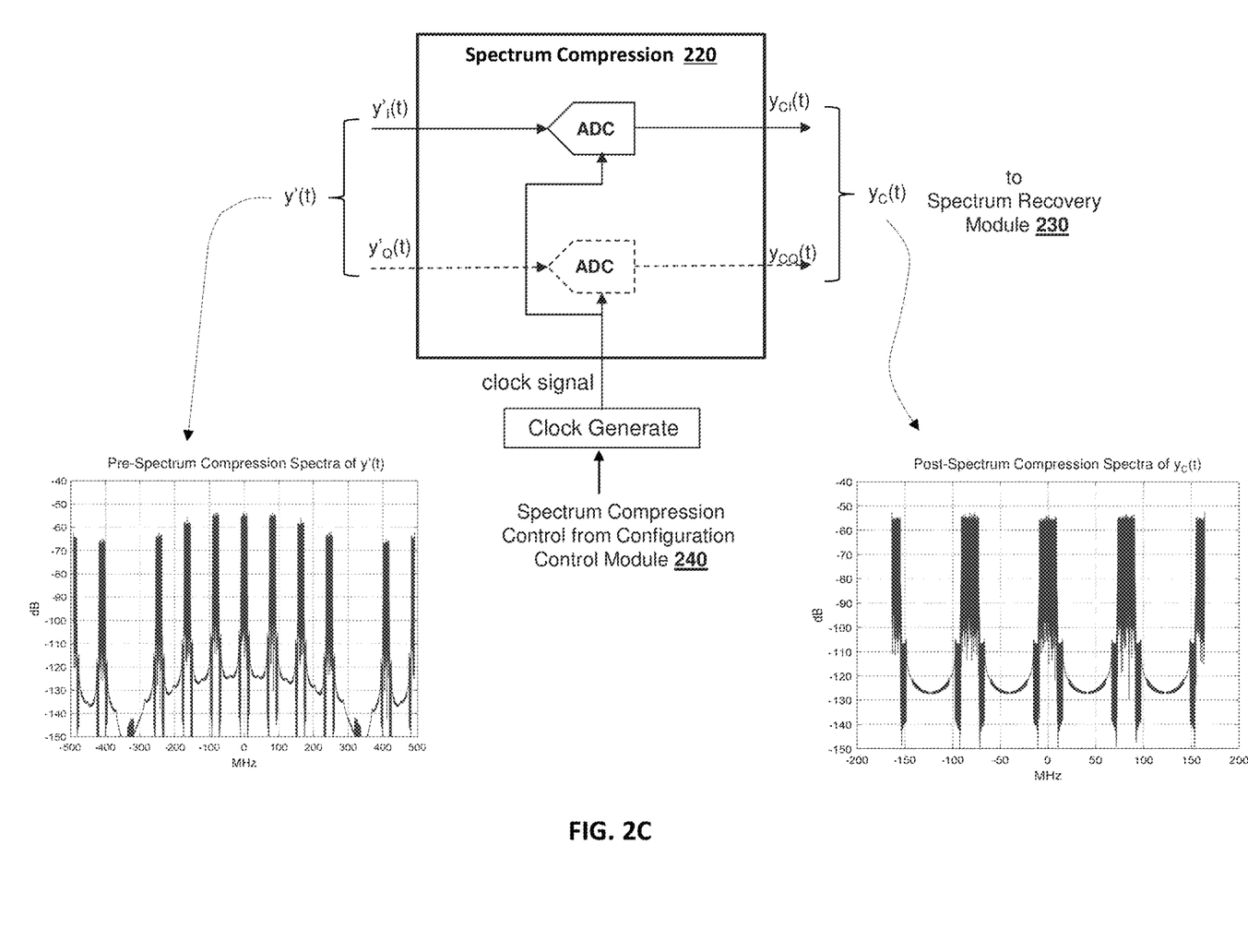
FIG. 2C depicts a high-level functional block diagram of a representative spectrum compression module, in accordance with various embodiments of the present disclosure.

FIG. 2C further depicts representative spectral properties of low-rate encoded analog signal y'(t), pre- and post-spectrum compression operations. As shown, pre-spectrum compression signal y'(t) exhibits a frequency span of 1.2 GHz while spectrum-compressed digital signal $y_c(t)$ exhibits a condensed frequency span of 400 MHz.

The spectrum-compressed digital signal $y_c(t)$ is subsequently transmitted downstream for decoding operations. Thus, by compressing the spectrum, the bandwidth of encoded analog signal y'(t) is reduced facilitating lower bandwidth processing components as well as lower bandwidth transmission media for forwarding the signals.

Receiver Spectrum Recovery Module

Figure 2D:
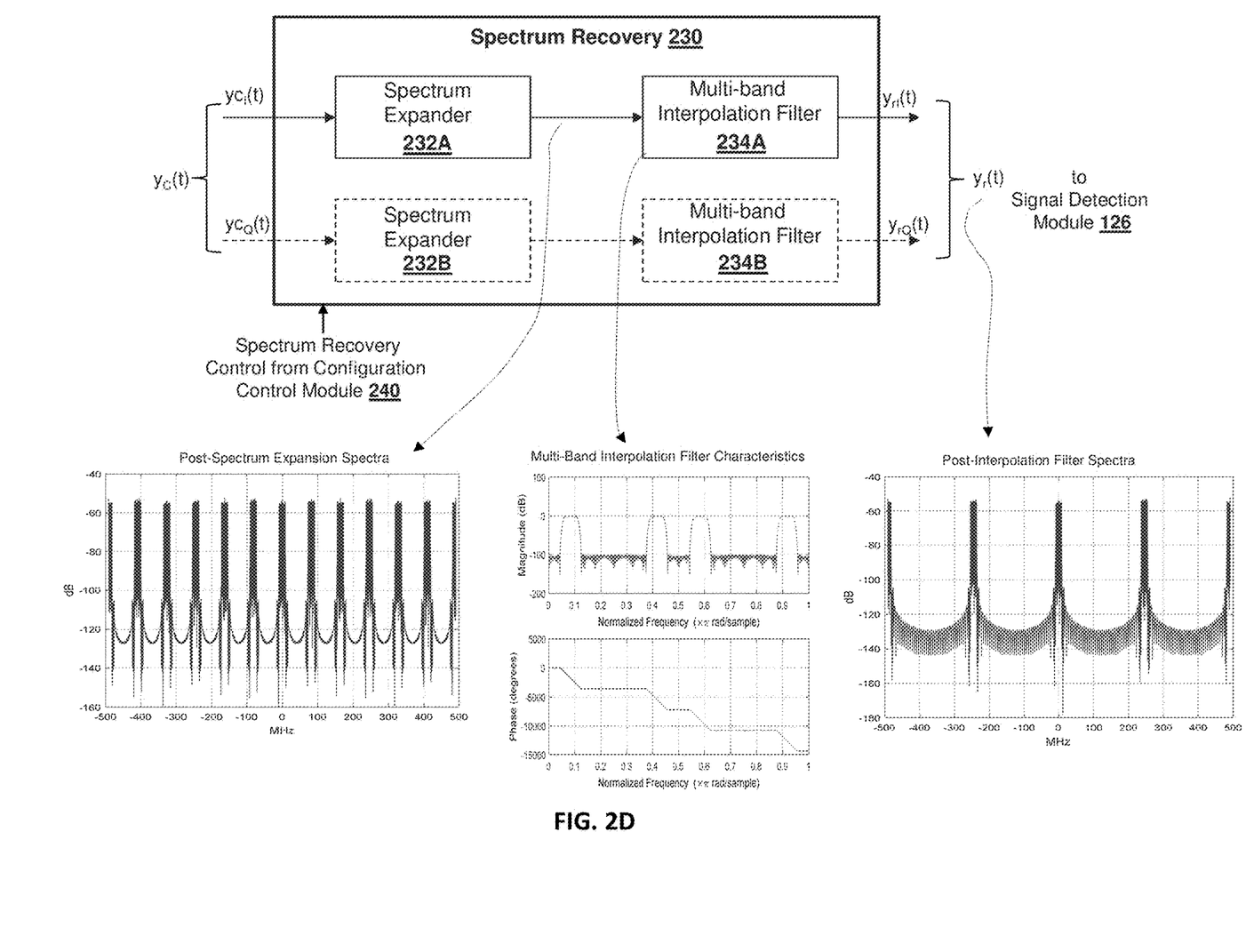
FIG. 2D depicts a high-level functional block diagram of a representative spectrum recovery module, in accordance with various embodiments of the present disclosure.

As indicated by FIG. 2D, the spectrum-compressed digital signal $y_c(t)$ is subsequently transmitted to spectrum recovery module 230. Spectrum recovery module 230 operates to recover the encoded signal information content from the spectrum-compressed digital signal $y_c(t)$. FIG. 2D depicts a high-level functional block diagram of spectrum recovery module 230, in accordance with various embodiments of the present disclosure.

As shown, spectrum recovery module 230 implements a spectrum expander module 232A/B and a multi-band interpolation filter module 234A/B. Spectrum expander module 232A/B is configured to perform up-sampling operations to convert the spectrum-compressed digital signal $y_c(t)$ back to the normal code rate.

In some embodiments, spectrum recovery module 230 may perform the up-sampling operation by injecting M samples having a zero-value within any two adjacent samples of the spectrum-compressed digital signal $y_c(t)$ signal in accordance with spectrum expansion ratio parameters. The control parameters for the spectrum expansion ratio may be provided by configuration control module 240.

FIG. 2D depicts representative spectral properties of post-spectrum expansion operations. As shown, the up-sampling operations may introduce undesired spectral images located at multiples of the digital signal $y_c(t)$ sampling rate. To filter out the undesired images as well as extract desired signal content, spectrum recovery module 230 implements multi-band interpolation filter module 234A/B.

The multi-band interpolation filter module 234A/B operates to interpolate and smooth out any discontinuities between the injected up-samples in the time domain as well as select the spectrum locations containing the desired signal content in the frequency domain. FIG. 2D depicts representative operational spectral properties of multi-band interpolation filter module 234A/B. In particular, the filter coefficient design parameters of multi-band interpolation filter module 234A/B are based on signal attributes after normal encoding (i.e., without compression), such as, for example, signal frequency allocations, number of signal spectrum allocations (i.e., number of bands), signal bandwidth, and image rejection attenuation (i.e., filter out-of-band signal rejection). Given these signal attributes, for a given PN code, the spectrum of the encoded signal is known. Therefore, the filter coefficient can be designed accordingly.

In so doing, the processing of multi-band interpolation filter module 234A/B generates a digital recovery signal $y_r(t)$ (or its in-phase and quadrature-phase components, $y_{rI}(t)$ and $y_{rQ}(t)$, respectively). FIG. 2D depicts representative spectral properties of post-interpolation filtering operations.

It will be appreciated that the performance of multi-band filter multi-band interpolation filter 234A/B is determined by the filter coefficient configuration, such as, for example, the number of filter coefficients and their corresponding values. These control parameters, may be provided by configuration control module 240.

Returning to FIG. 2A, the digital recovery signal $y_r(t)$ (or its in-phase and quadrature-phase components, $y_{rI}(t)$ and $y_{rQ}(t)$, respectively) are forwarded to signal detection module 126. As detailed above relative to FIG. 1B, signal detection module 126 operates to decode and recover the encoded signal information by processing digital recovery signal $y_r(t)$ in conjunction with the normal rate code scheme $c_i(t)$ to output digital signals $x'(t)$: $x'_1(t)$, $x'_2(t)$ ... $x'_n(t)$. Digital signals $x'(t)$ provide replicas of the original analog input (branch) signals $x(t)$ and manifest the desired information content provided by the original signals $x(t)$: $x_1(t)$, $x_2(t)$ ... $x_n(t)$.

Compression Receiver Processing

Figure 3:
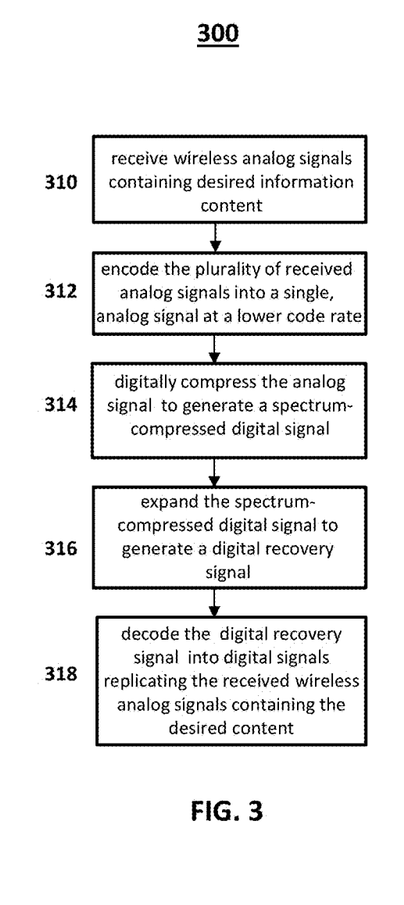
FIG. 3 depicts a functional flow diagram of compression receiver processing, in accordance with various embodiments of the present disclosure.

FIG. 3 depicts a functional flow diagram of process 300 directed to compression receiver processing, in accordance with various embodiments of the present disclosure.

As shown, process 300 begins at task block 310, in which compression receiver architecture 200 receives a plurality of wireless analog signals containing desired information content. As noted above, architecture 200 may include one or more antenna structures operative to receive the wireless analog signals.

Process 300 proceeds to task block 312, where architecture 200 encodes the plurality of received signals into a single analog signal, based on a compressed coding scheme. As noted above, code compression module 210 operates to compress the normal code rate supplied to branch compression module 120. In turn branch compression module 120 operates to mix and combine the multiple received signals with the compressed rate coding scheme to output a single, lower-rate analog signal.

At task block 314, architecture 200 operates to digitally compress the lower rate analog signal to generate a spectrum-compressed digital signal. As discussed above, spectrum compression module 220 implements under-sampling digital conversion techniques to produce a digital signal containing the desired information content with a condensed frequency spectrum.

Process 300 advances to task block 316, where architecture 200 operates to expand the spectrum-compressed digital signal to generate a digital recovery signal manifesting the desired information content. That is, as described above, spectrum recovery module 230 performs up-sampling operations to expand the bandwidth of spectrum-compressed digital signal and then filters the expanded-bandwidth digital signal to select spectral locations containing the desired information content to produce the digital recovery signal.

Finally, at task 318, architecture 200 decodes the digital recovery signal to output analog signals replicating the received wireless analog signals containing the desired content. As previously described, signal detection module 126 operates to decode and recover the encoded signal information by mixing and integrating the digital recovery signal with the normal rate code scheme to produce analog signals that are replicas of the originally-received analog input signals manifesting the desired information content.

Thus, by virtue of the compression techniques employed by compression receiver architecture 200, hardware/software processing speeds are reduced, lower-bandwidth transmission media may be implemented, and power consumption is decreased.

It is to be understood that the operations and functionality of the described wireless receiver architecture, constituent components, and associated processes may be achieved by hardware-based, software-based, firmware-based elements and/or combinations thereof. Such operational alternatives do not, in any way, limit the scope of the present disclosure.

It will also be understood that, although the inventive concepts and principles presented herein have been described with reference to specific features, structures, and embodiments, it is clear that various modifications and combinations may be made without departing from such disclosures. The specification and drawings are, accordingly, to be regarded simply as an illustration of the inventive concepts and principles as defined by the appended claims, and are contemplated to cover any and all modifications, variations, combinations or equivalents that fall within the scope of the present disclosure.

What is claimed is:

1. A wireless receiver architecture, comprising:
a signal encoding module configured to encode a plurality of analog signals received from an antenna structure containing desired information content into a single encoded analog signal in accordance with a coding scheme have a first code rate;
a spectrum compression module configured to generate a spectrum-compressed digital signal representative of the single encoded analog signal;
a spectrum recovery module configured to receive the spectrum-compressed digital signal and expand the spectrum-compressed digital signal to the first code rate and to generate a digital recovery signal containing the desired information content; and
a signal detection module configured to decode the digital recovery signal in accordance with the coding scheme and to output a plurality of analog signals replicating the received analog signals containing the desired information content.

2. The wireless receiver architecture of claim 1, further comprising a code compression module operative to compress the coding scheme by reducing the first code rate to a second code rate in accordance with a code compression rate parameter and to supply the compressed code scheme to the signal encoding module.

3. The wireless receiver architecture of claim 2, wherein the code compression module is configured to perform down-sampling operations on the coding scheme to generate the compressed code scheme at the second code rate.

4. The wireless receiver architecture of claim 2, further comprising a configuration control module configured to provide control signal parameters to the code compression module, the spectrum compression module, and the spectrum recovery module.

5. The wireless receiver architecture of claim 4, wherein the control signal parameters include on or more of the following: a code type, a code rate, a code compression rate, a spectrum compression rate, a spectrum expansion ratio, an ADC clock rate, and filter coefficients.

6. The wireless receiver architecture of claim 1, wherein the spectrum compression module is further configured to perform an under-sampling digital conversion operation on the single encoded analog signal to generate the spectrum-compressed digital signal.

7. The wireless receiver architecture of claim 6, wherein the under-sampling digital conversion operation is performed by controlling a clock-driving signal to analog-to-digital converters (ADCs) to under-sample the single encoded analog signal in accordance with a spectrum compression rate parameter.

8. The wireless receiver architecture of claim 1, wherein the spectrum recovery module is further configured to perform an up-sampling operation on the spectrum-compressed digital signal to provide an expanded-bandwidth digital signal manifesting the first code rate.

9. The wireless receiver architecture of claim 8, wherein the up-sampling operation operates to inject M samples having a zero-value within any two adjacent samples of the spectrum-compressed digital signal in accordance with a spectrum expansion ratio parameter, wherein M is an integer.

10. The wireless receiver architecture of claim 8, wherein the spectrum recovery module is further configured to filter the expanded-bandwidth digital signal to select spectral locations of the desired information content to produce the digital recovery signal, in accordance with filter coefficient parameters.

11. A method of processing wireless signals, comprising:
receiving a plurality of wireless analog signals containing desired information content;
encoding the plurality of wireless received analog signals into a single encoded analog signal in accordance with a coding scheme having a first code rate;
compressing the single encoded analog signal to generate a spectrum-compressed digital signal representative of the single encoded analog signal;
expanding the spectrum-compressed digital signal to the first code rate to generate a digital recovery signal containing the desired information content; and
decoding the digital recovery signal in accordance with the coding scheme to output a plurality of analog signals replicating the received wireless analog signals containing the desired information content.

12. The method of claim 11, wherein the digitally compressing the single encoded analog signal is performed by under-sampling digital conversion operation on the single encoded analog signal to generate the spectrum-compressed digital signal.

13. The method of claim 12, wherein the under-sampling digital conversion operation is performed by controlling a clock-driving signal to analog-to-digital converters (ADCs) to under-sample the single encoded analog signal in accordance with a spectrum compression rate parameter.

14. The method of claim 11, further comprising compressing the coding scheme by reducing the first code rate to a second code rate in accordance with a code compression rate parameter to generate a compressed code scheme at the second code rate.

15. The method of claim 14, wherein the compressing of the coding scheme is performed by down-sampling the coding scheme to generate the compressed code scheme at the second code rate.

16. The method of claim 14, wherein the expanding of the spectrum-compressed digital signal is performed by an up-sampling operation on the spectrum-compressed digital signal to generate an expanded-bandwidth digital signal manifesting the first code rate.

17. The method of claim 16, wherein the up-sampling operation is performed by injecting M samples having a zero-value within any two adjacent samples of the spectrum-compressed digital signal in accordance with a spectrum expansion ratio parameter, wherein M is an integer.

18. The method of claim 16, wherein the expanding of the spectrum-compressed digital signal further includes filtering the expanded-bandwidth digital signal to select spectral locations of the desired information content to produce the digital recovery signal, in accordance with filter coefficient parameters.

19. The method of claim 16, further comprising providing control signal parameters for controlling the operations of generating the compressed code scheme, generating the expanded-bandwidth digital signal, generating the expanded bandwidth digital signal, and generating the digital recovery signal.

20. The method of claim 19, wherein the control signal parameters include on or more of the following: a code type, a code rate, a code compression rate, a spectrum compression rate, a spectrum expansion ratio, an ADC clock rate, and filter coefficients.

* * * * *